US010650804B2

(12) United States Patent
Dolan et al.

(10) Patent No.: US 10,650,804 B2
(45) Date of Patent: *May 12, 2020

(54) SENTIMENT-BASED RECOMMENDATIONS AS A FUNCTION OF GROUNDING FACTORS ASSOCIATED WITH A USER

(71) Applicant: Microsoft Technology Licensing, LLC, Redmond, WA (US)

(72) Inventors: Bill Dolan, Redmond, WA (US); Margaret Mitchell, Redmond, WA (US); Jay Banerjee, Redmond, WA (US); Pallavi Choudhury, Redmond, WA (US); Susan Hendrich, Redmond, WA (US); Rebecca Mason, Redmond, WA (US); Ron Owens, Redmond, WA (US); Mouni Reddy, Redmond, WA (US); Yaxiao Song, Redmond, WA (US); Kristina Toutanova, Redmond, WA (US); Liang Xu, Redmond, WA (US); Xuetao Yin, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 59 days.

This patent is subject to a terminal disclaimer.

(21) Appl. No.: 15/978,892

(22) Filed: May 14, 2018

(65) Prior Publication Data
US 2018/0261211 A1 Sep. 13, 2018

Related U.S. Application Data

(63) Continuation of application No. 14/475,450, filed on Sep. 2, 2014, now Pat. No. 9,978,362.

(51) Int. Cl.
*G10L 15/08* (2006.01)
*G06N 7/00* (2006.01)
(Continued)

(52) U.S. Cl.
CPC .............. *G10L 15/08* (2013.01); *G06F 3/048* (2013.01); *G06F 16/00* (2019.01); *G06F 40/279* (2020.01);
(Continued)

(58) Field of Classification Search
CPC ......... G10L 15/08; G10L 15/00; G10L 15/01; G10L 15/06; G10L 15/063; G10L 15/144;
(Continued)

(56) References Cited

U.S. PATENT DOCUMENTS 8,843,497 B2 * 9/2014 Stankiewicz ...... G06Q 30/0631
707/740
10,127,522 B2 * 11/2018 Pennacchiotti ........ G06Q 10/10
(Continued)

FOREIGN PATENT DOCUMENTS

WO 2013118923 A1 8/2013

OTHER PUBLICATIONS

"First Office Action Issued in Chinese Patent Application No. 201480067158.9", dated Dec. 4, 2018, 8 Pages.
(Continued)

*Primary Examiner* — Qi Han
(74) *Attorney, Agent, or Firm* — Alleman Hall Creasman & Tuttle LLP

(57) ABSTRACT

A "Facet Recommender" creates conversational recommendations for facets of particular conversational topics, and optionally for things associated with those facets, from consumer reviews or other social media content. The Facet Recommender applies a machine-learned facet model and optional sentiment-model, to identify facets associated with spans or segments of the content and to determine neutral, positive, or negative consumer sentiment associated with those facets and, optionally, things associated with those facets. These facets are selected by the facet model from a
(Continued)

Exemplary Processes for Training Facet and Sentiment Models list or set of manually defined or machine-learned facets for particular conversational topic types. The Facet Recommender then generates new conversational utterances (i.e., short neutral, positive or negative suggestions) about particular facets based on the sentiments associated with those facets. In various implementations, utterances are fit to one or more predefined conversational frameworks. Further, responses or suggestions provided as utterances may be personalized to individual users.

20 Claims, 5 Drawing Sheets

(51) Int. Cl.
   *G06N 20/00* (2019.01)
   *G06F 16/00* (2019.01)
   *G06Q 30/02* (2012.01)
   *G06F 40/56* (2020.01)
   *G06F 40/279* (2020.01)
   *G06F 3/048* (2013.01)
(52) U.S. Cl.
   CPC .............. *G06F 40/56* (2020.01); *G06N 7/005* (2013.01); *G06N 20/00* (2019.01); *G06Q 30/0201* (2013.01)
(58) Field of Classification Search
   CPC ....... G10L 15/16; G10L 15/18; G10L 15/183; G10L 15/22; G10L 15/24; G10L 15/26; G10L 13/08; G10L 13/00; G10L 13/033; G10L 13/043; G06F 17/27; G06F 17/2705; G06F 17/271; G06F 17/2715; G06F 17/2765; G06F 17/278; G06F 17/2785; G06F 17/28; G06F 17/2836; G06F 17/2872; G06F 17/2881; G06F 17/30
   USPC ....... 704/257, 254, 255, 258, 259, 266, 269, 704/276, 277, 278, 9, 10
   See application file for complete search history.

(56) References Cited

U.S. PATENT DOCUMENTS

| 2010/0088323 | A1* | 4/2010 | Ashkenazi | G06F 16/904 |
| | | | | 707/752 |
| 2012/0041937 | A1* | 2/2012 | Dhillon | G06F 16/36 |
| | | | | 707/708 |
| 2012/0246054 | A1 | 9/2012 | Sastri | |
| 2013/0018824 | A1* | 1/2013 | Ghani | G06N 20/00 |
| | | | | 706/12 |

OTHER PUBLICATIONS

"Office Action Issued in European Patent Application No. 15760050.3", dated Mar. 2, 2020, 8 pages.

* cited by examiner

SENTIMENT-BASED RECOMMENDATIONS AS A FUNCTION OF GROUNDING FACTORS ASSOCIATED WITH A USER

CROSS-REFERENCE TO RELATED APPLICATIONS

This application is a Continuation of U.S. patent application Ser. No. 14/475,450, filed on Sep. 2, 2014, and entitled "FACET RECOMMENDATIONS FROM SENTIMENT-BEARING CONTENT."

BACKGROUND

Typical recommendation systems generate recommendations for things such as movies, books, items to purchase, restaurants, etc., using a variety of statistical or machine learning techniques, or combinations of such techniques to filter possible choices. For example, recommendation systems often use collaborative filtering or content-based filtering mechanisms to construct models for use in making recommendations, and may use combinations of both types of filtering.

Collaborative filtering approaches generally construct user-based models from information derived from observed user behaviors. Examples of behaviors evaluated to construct such models include prior user choices or purchases, and may also include user ratings for those choices or purchases. The resulting models are then used to predict other things of potential interest to users.

Content-based filtering approaches generally construct models based on item characteristics to recommend similar items to users. For example, if a user expresses interest in mystery movies, a content-based recommendation system would recommend other mystery movies. Further, such recommendations may be ordered or ranked using scores or the like generated from ratings provided by other users (i.e., combined content-based and collaborative filtering). Such recommendations can be further narrowed by attempting to identify ratings from users that have similar interests to a user for which a recommendation is being provided.

SUMMARY

The following Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of other technologies may be noted or discussed herein, the claimed subject matter is not intended to be limited to implementations that may solve or address any or all of the disadvantages of those other technologies. The sole purpose of this Summary is to present some concepts of the claimed subject matter in a simplified form as a prelude to the more detailed description that is presented below.

In general, a "Facet Recommender," as described herein, may create and present recommendations for facets of particular conversational topics, and optionally for entities associated with those facets, from sentiment-bearing content such as consumer reviews, social media content (e.g., text or speech based content), or other opinion-bearing online content.

Note that in the context of the following discussion, the term "facet" is defined as referring to specific characteristics or entities associated with particular conversational topics. For example, with respect to a restaurant-based conversational topic, facets may include, but are not limited to, restaurant type (e.g., Italian, gluten free, vegetarian, Brazilian barbecue, etc.), menus, food items (or particular categories or types of food items), drinks, service, staff, atmosphere, ambience, amenities, entertainment, games, customers, events, price, wait times, freshness, etc. Each facet may also be further segmented into sub-facets. For example, a food items facet may include sub-facets of beef, seafood, poultry, vegetarian, etc., each of which may also be individually treated as a facet.

The Facet Recommender applies a machine-learned facet model to the sentiment-bearing content to identify conversational topic facets associated with spans or segments of that content. In various implementations, the Facet Recommender also optionally uses the facet model and/or a machine-learned sentiment model to determine any of neutral sentiment (also including cases where no sentiment is evident in the content), positive sentiment, or negative sentiment associated with conversational topics, facets or corresponding entities. Note that in various implementations, these facets are selected by the facet model from a list or set of manually defined or machine-learned facets for particular conversational topic types.

The Facet Recommender then generates new conversational utterances (i.e., short neutral, positive or negative suggestions) about particular facets that may be based on the sentiments associated with those facets, and that are optionally based on determinations of a "consensus" for facets and/or sentiments. Further, in various implementations, these utterances are created by fitting facets, associated spans or segments extracted from the sentiment-bearing content, and/or sentiments associated with particular conversational topics to one or more predefined conversational frameworks. Stated differently, conversational utterances may be created by populating slots in various conversational frameworks with facets, associated spans or segments extracted from, or identified in, the sentiment-bearing content, and/or sentiments associated with particular conversational topics.

In other words, in various implementations, the Facet Recommender uses a machine-learned facet model and/or a machine-learned sentiment model to evaluate a plurality of samples of sentiment-bearing content to identify conversational topics and facets associated with one or more segments of that content, and to optionally determine sentiment corresponding to each of those facets. The Facet Recommender then uses this information to generate a plurality of conversational utterances about one or more of the identified facets. In addition, in various implementations, one or more of the conversational utterances are generated by fitting one or more facets, or associated spans or segments of the content, to one or more predefined conversational frameworks that are optionally consistent with any associated sentiment.

In view of the above summary, it is clear that the Facet Recommender described herein provides various techniques for applying a machine-learned facet model and/or a machine-learned sentiment model to identify facets of conversational topics and optional corresponding sentiments from sentiment-bearing content, and to create recommendations in the form of conversational utterances for those facets for presentation to users. In addition to the just described benefits, other advantages of the Facet Recommender will become apparent from the detailed description that follows hereinafter when taken in conjunction with the accompanying drawing figures.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION

Figure 1:
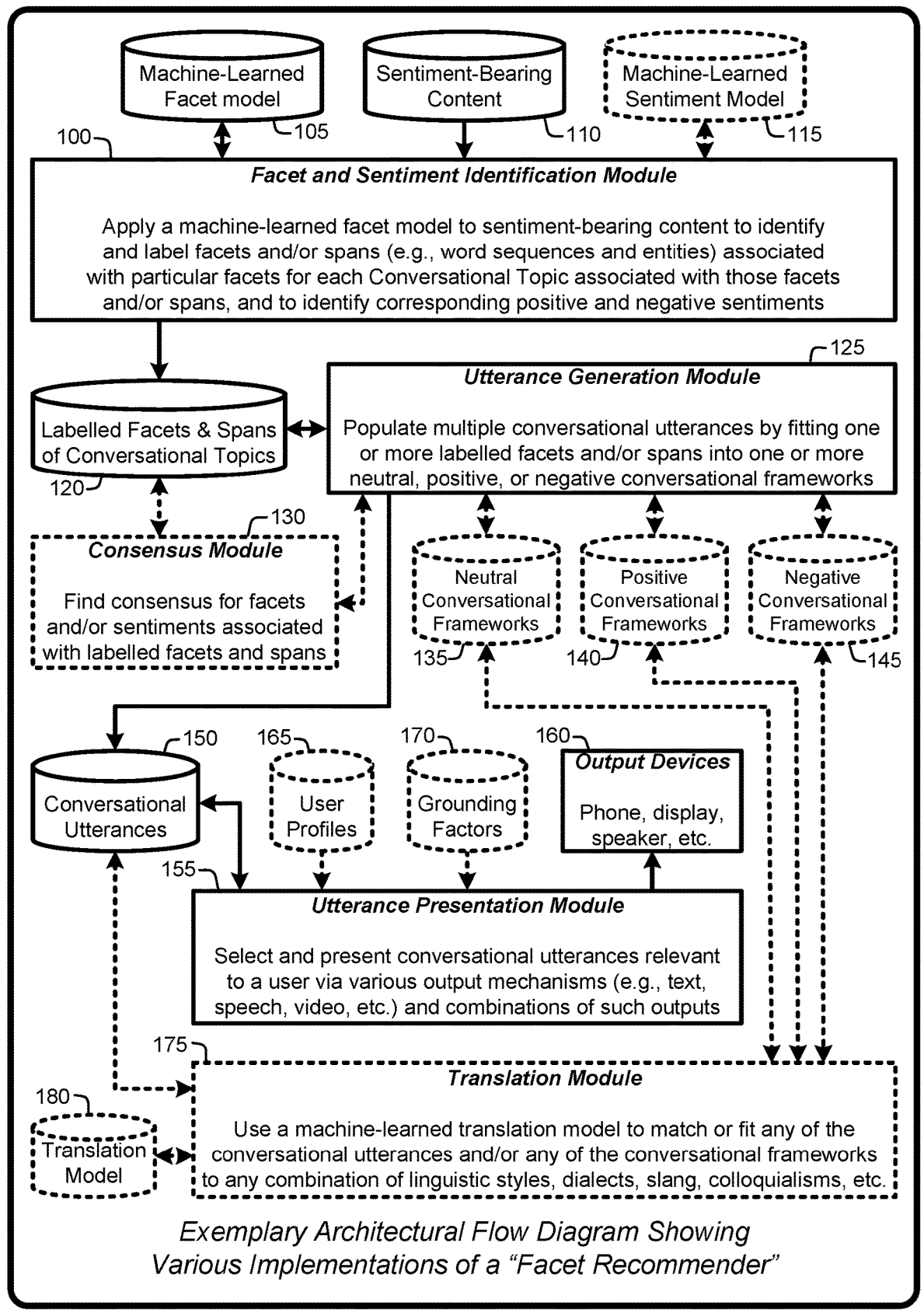
FIG. 1 provides an exemplary architectural flow diagram that illustrates program modules of various implementations of a "Facet Recommender" that evaluates sentiment-bearing content to create recommendations in the form of conversational utterances for facets associated with particular conversational topics, as described herein.

In the following description of various implementations of a "Facet Recommender," reference is made to the accompanying drawings, which form a part hereof, and in which is shown by way of illustration specific implementations in which the Facet Recommender may be practiced. It should be understood that other implementations may be utilized and structural changes may be made without departing from the scope thereof.

It is also noted that, for the sake of clarity, specific terminology will be resorted to in describing the various implementations described herein, and that it is not intended for these implementations to be limited to the specific terms so chosen. Furthermore, it is to be understood that each specific term includes all its technical equivalents that operate in a broadly similar manner to achieve a similar purpose. Reference herein to "one implementation," or "another implementation," or an "exemplary implementation," or an "alternate implementation" or similar phrases, means that a particular feature, a particular structure, or particular characteristics described in connection with the implementation can be included in at least one implementation of the Facet Recommender. Further, the appearance of such phrases throughout the specification are not necessarily all referring to the same implementation, nor are separate or alternative implementations mutually exclusive of other implementations.

It should also be understood that the order described or illustrated herein for any process flows representing one or more implementations of the Facet Recommender does not inherently indicate any requirement for the processes to be implemented in the order described or illustrated, nor does any such order described or illustrated herein for any process flows imply any limitations of the Facet Recommender.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive in a manner similar to the term "comprising" as an open transition word without precluding any additional or other elements.

1.0 Introduction

In general, a "Facet Recommender," as described herein, provides various techniques for creating conversational recommendations for facets of particular conversational topics, and optionally for entities associated with those facets, from "sentiment-bearing content" such as consumer reviews, social media content (e.g., text, image, speech, or video-based content, or any combination thereof), or any other online opinion-bearing content.

In the context of the following discussion, the term "conversational topic" is defined herein as referring to physical locations (e.g., restaurants, stores, shopping centers, travel destinations, movie theaters, museums, parks, beaches, hotels, etc.), to online websites or services (e.g., shopping sites, websites having content such as movies, music, images, text, etc., that may be viewed or consumed by the user), and to other identifiable conversational topics including, but clearly not limited to, books, music, politics, current events, sports, hobbies, etc.

Further, in the context of the following discussion, the term "facet" is defined as referring to specific characteristics or entities associated with particular conversational topics. For example, with respect to a restaurant conversational topic, facets may include, but are not limited to, restaurant type (e.g., Italian, gluten free, vegetarian, Brazilian barbecue, etc.), menus, food items (or particular categories or types of food items), drinks, service, staff, atmosphere, ambience, amenities, entertainment, games, customers, events, price, wait times, freshness, etc. Each facet may also be further segmented into sub-facets. For example, a food items facet may include sub-facets of beef, seafood, poultry, vegetarian, etc., each of which may also be individually treated as a facet.

In addition, the terms "span" and "segment" are used interchangeably, and are defined herein as referring to any combination of word, text, and image sequences in sentiment-bearing content that is associated with particular facets in that sentiment-bearing content, or with particular expressions of sentiment in that content.

Further, the term "sentiment vocabulary" is defined as an extended vocabulary for use in determining sentiment for particular conversational topics or facets. In various implementations, the sentiment vocabulary is defined by words or phrases associated with neutral, positive or negative sentiment, by indications of neutral, positive or negative sentiment presented in the form of any emotion-based or related emoticons or images, or by textual portrayals of a person's mood or facial expression. For example, the text segment "8-)" may indicate a "smiley face" corresponding to a textual portrayal of a positive sentiment.

1.1 System Overview:

As noted above, the Facet Recommender provides various techniques for applying a machine-learned facet model and/or a machine-learned sentiment model to identify facets of conversational topics, and optional corresponding sentiments, from sentiment-bearing content, and to create recommendations in the form of conversational utterances from those facets for presentation to users. The processes summarized above are illustrated by the architectural flow diagram of FIG. 1. In particular, FIG. 1 illustrates interrelationships between program modules for effecting various implementations of the Facet Recommender, as described herein. Furthermore, while the diagram of FIG. 1 illustrates a high-level view of various implementations of the Facet Recommender, FIG. 1 is not intended to provide an exhaustive or complete illustration of every possible implementation of the Facet Recommender as described throughout this document.

In addition, it should be noted that any boxes and interconnections between boxes that may be represented by broken or dashed lines in FIG. 1 represent alternate implementations of the Facet Recommender described herein, and that any or all of these alternate implementations, as described below, may be used in combination with other alternate implementations that are described throughout this document.

In general, as illustrated by FIG. 1, the processes enabled by the Facet Recommender begin operation by using a facet and sentiment identification module 100 that applies a machine-learned facet model 105 to sentiment-bearing content 110 to identify and label facets and/or spans of conversational topics 120. Note that this sentiment-bearing content 110 may continuously evolve and expand over time as additional information becomes available from any of a variety sources. The resulting labelled facets and spans of conversational topics 120 identified via the machine-learned facet model 105 are then provided to an utterance generation module 125. In various implementations, the facet and sentiment identification module 100 also optionally uses the machine-learned facet model 105 or a separate machine-learned sentiment model 115 to identify neutral sentiments (which is also specifically defined as including cases where no sentiment is evident in the content), positive sentiments, and negative sentiments associated with the identified and labeled facets and/or spans.

Further, in various implementations, the machine-learned facet model 105 and/or the machine-learned sentiment model 115 considers age or "freshness" of the sentiment-bearing content 110. For example, particular items or entries of the sentiment-bearing content 110 tend to become less relevant over time with respect to various conversational topics, e.g., restaurants, politics, current events, etc. Consequently, in various implementations, the Facet Recommender uses a modified machine-learned facet model 105 and/or a modified machine-learned sentiment model 115 that down-weights or disregards particular items or entries of the sentiment-bearing content 110 depending on the age of that content.

The utterance generation module 125 then uses the labelled facets and spans of conversational topics 120 to populate multiple conversational utterances 150 by fitting the labelled facets and/or associated spans into one or more corresponding predefined neutral, positive or negative conversational frameworks (135, 140, and 145, respectively). The utterance generation module 125 then outputs or stores the conversational utterances 150 for later use. Note also that in various implementations, a user interface or the like (not shown) is provided to allow users to customize, create, and/or remove one or more neutral conversational frameworks 135, positive conversational frameworks 140 or negative conversational frameworks 145.

In related implementations, the Facet Recommender uses an optional consensus module 130 to evaluate the labelled facets and spans of conversational topics 120 to determine consensus facets. In particular, a "consensus facet" is defined herein as a facet for which multiple people have generated sentiment-bearing content 110 discussing or referring to particular facets of a particular conversational topic. Note that in various implementations, the relevancy of particular labelled facets and/or spans 120 will be increased by the consensus module 130 as the number of corresponding labelled items derived from the sentiment-bearing content 110 increases. Then, when subsequently creating conversational utterances 150, or presenting conversational utterances to the user, as discussed below, the Facet Recommender may optionally limit the creation and/or presentation of such utterances to those that have a consensus facet. Alternately, the facet recommender may optionally present utterances have a consensus facet with a higher probability than utterances without a consensus facet.

In further related implementations, the consensus module 130 evaluates the labelled facets and spans of conversational topics 120 to determine consensus sentiments for conversational topics and/or one or more facets associated with particular conversational topics. In particular, a "consensus sentiment" is defined herein as a neutral, positive, or negative sentiment associated with a majority of the labelled facets and/or spans for a particular facet and/or span of a particular conversational topic, and may also be a consensus sentiment associated with a particular conversational topic. Then, when subsequently creating conversational utterances, or presenting conversational utterances to the user, as discussed below, the Facet Recommender may optionally limit the creation and/or presentation of such utterances to those that have a consensus sentiment.

Further, in various implementations, when optionally considering consensus sentiment, if a majority of the sentiment-bearing content 110 associated with a particular conversational topic or facet has positive sentiment, then the Facet Recommender may provide a selected subset of corresponding positive labelled facets and spans of conversational topics 120 to the utterance generation module 125. The utterance generation module 125 may then use the selected subset of positive labelled facets and spans of conversational topics 120 to populate positive conversational frameworks 140 to create conversational utterances 150 for the corresponding conversational topic. Conversely, if a majority of the sentiment-bearing content 110 associated with a particular conversational topic or facet have negative sentiment, then the Facet Recommender may provide a selected subset of negative labelled facets and spans of conversational topics 120 to the utterance generation module 125. The utterance generation module 125 may then use the selected subset of negative labelled facets and spans of conversational topics 120 to populate negative conversational frameworks 145 to create conversational utterances 150 for the corresponding conversational topic. Similar processes are performed with respect to particular conversational topics or facets having a neutral (or no evident) sentiment.

An utterance presentation module 155 then selects and presents one or more conversational utterances 150 that are relevant to particular users via various output devices 160 or mechanisms (e.g., text, speech, video, etc.) and combinations of such outputs. In various implementations, the utterance presentation module 155 may consider either or both any consensus facet or any consensus sentiment associated with particular conversational utterances 150 when determining which conversational utterances to present to the user. In addition, in various implementations, presentation of the conversational utterances may be either or both proactive or reactive, as discussed in further detail below.

Further, in various implementations, the utterance presentation module 155 considers age or "freshness" of the conversational utterances 150. In particular, as with the sentiment-bearing content 110 used to generate conversational utterances 150, those conversational utterances tend to become less relevant over time with respect to various conversational topics, e.g., restaurants, politics, current events, etc. Consequently, in various implementations, the utterance presentation module 155 down-weights (i.e., makes presentation less likely), disregards, or deletes particular conversational utterances 150, depending on the age of those conversational utterances.

Further, in various implementations, the utterance presentation module 155 may consider user profiles 165 or other user personalization information to select one or more of the conversational utterances 150 for presentation. Examples of user profiles 165 or other user personalization information includes, but is not limited to, profile information derived from past user behaviors, interests or preferences of current or known associates, etc.

Similarly, in related implementations the utterance presentation module 155 may also consider various grounding factors 170, either alone or in combination with the user profiles 165 or other user personalization information, to select one or more of the conversational utterances 150 for presentation. Examples of grounding factors or information include, but are not limited to, weather, time of day, local traffic, audio, vision, etc.

In addition, in various implementations, an optional translation module 180 applies a machine-learned translation model 180, or the like, to match or fit any of the conversational utterances 150, the neutral conversational frameworks 135, the positive conversational frameworks 140, and the negative conversational frameworks 145, to any combination of language features including linguistic styles, dialects, slang, colloquialisms, etc., which are referred to collectively herein as "linguistic styles." As discussed in further detail in Section 2.4.1, this enables to Facet Recommender to present conversational utterances using linguistic styles that appear to have been generated by the same person or personality.

Figure 2:
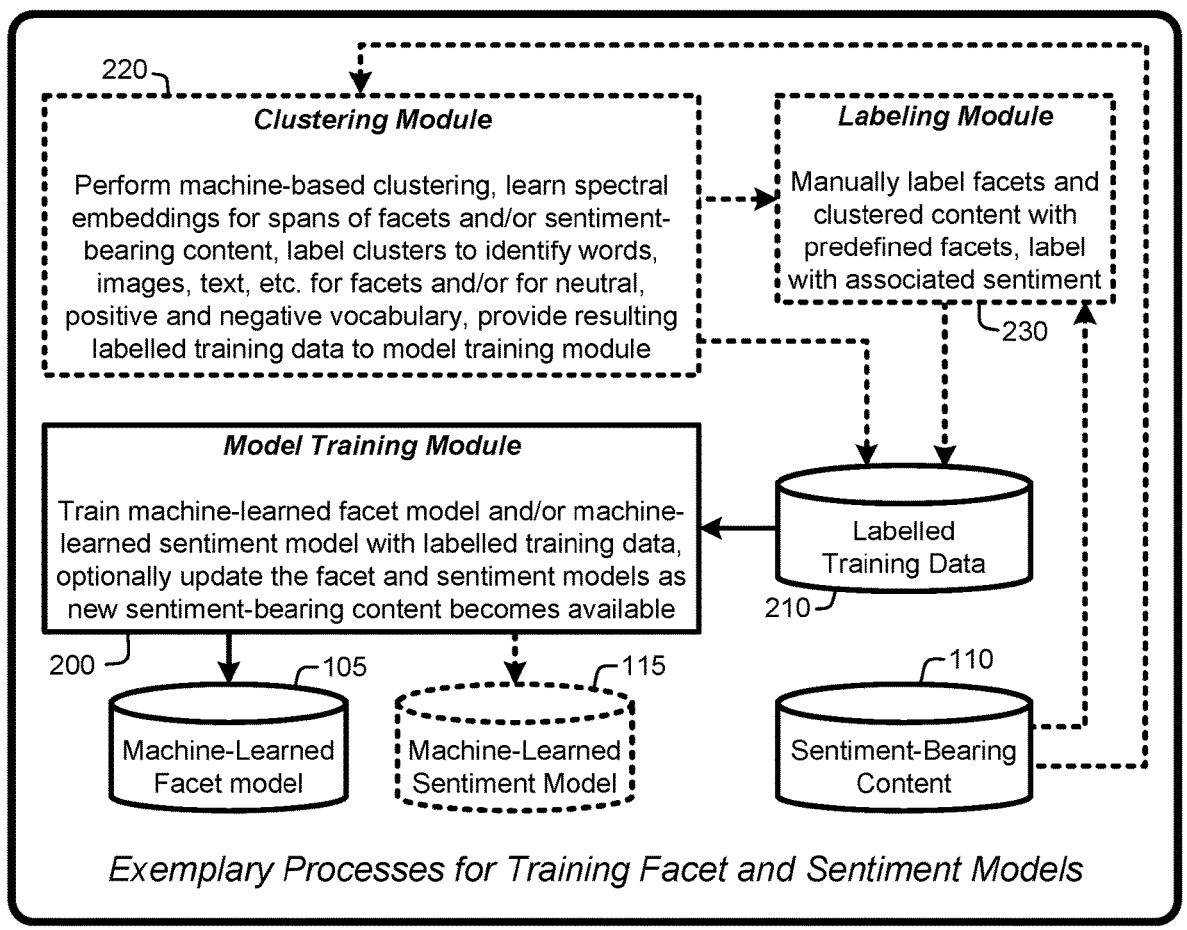
FIG. 2 provides an exemplary architectural flow diagram that illustrates program modules showing various exemplary processes for training a machine-learned facet model and an optional machine-learned sentiment model, as described herein.

In general, the Facet Recommender is capable of applying or adapting any of a wide range of machine-learning techniques to construct the aforementioned machine-learned facet model 105 and/or the machine-learned sentiment model 115. FIG. 2 provides an exemplary architectural flow diagram that illustrates program modules showing various exemplary processes for training the machine-learned facet model 105 and/or the machine-learned sentiment model 115.

Note that processes illustrated by the architectural flow diagram of FIG. 2 illustrates the interrelationships between program modules for effecting various processes for training the machine-learned facet model 105 and/or the machine-learned sentiment model 115 of FIG. 1. Furthermore, while FIG. 2 illustrates various processes for training such models, all of the implementations illustrated represent optional processes for training the machine-learned facet model 105 and/or the machine-learned sentiment model 115. In addition, it should also be understood that FIG. 2 is not intended to provide an exhaustive or complete illustration of every possible process for training facet models for use with the Facet Recommender. Further, the machine-learned sentiment model 115 of FIG. 1 may be trained using a variety of machine-learning techniques similar to, or distinct from, those described below for training of the machine-learned facet model 105.

For example, in various implementations, a model training module 200 trains the machine-learned facet model 105 and/or the machine-learned sentiment model 115 from various combinations of labelled training data 210. In various implementations, this labelled training data 210 includes, but is not limited to, various combinations of automatically clustered sentiment-bearing content, spectral embeddings learned from the clusters, automatic or hand annotated or labelled clusters to identify words for facets and optional neutral, positive, or negative "sentiment vocabulary," various features such as capitalization features, character n-grams, where words or characters appear in a span or segment of a review or other sentiment-bearing content, etc.

The labelled training data 210 is created by applying any of a variety of techniques. In various implementations, these techniques include, but are not limited to, applying a clustering module 220 to perform machine-based clustering (e.g., Brown clusters or other clustering techniques) of related facets identified in training data (e.g., sentiment-bearing content obtained from any available source). In various implementations, the clustering module 220 may also automatically learn spectral embeddings for spans of that training data. In various implementations, the clustering module 220 is also used to annotate or label the clusters to identify words and phrases associated with facets and to optionally identify elements of a "sentiment vocabulary" that is used to identify neutral, positive, and negative sentiment associated with sentiment-bearing content in the training data. Further, in related implementations, a labeling module 230 is provided to allow manual labeling of facets and/or clusters of sentiment-bearing content according to predefined or user-defined facets, and the sentiment associated with those labels.

In various implementations, the model training module 200 optionally periodically updates the facet model 105 and/or the machine-learned sentiment model 115. In general, such updates are enabled by processing new sentiment-bearing content 110 that becomes available over time to update the labelled training data 210, which in turn is applied to retrain or update the machine-learned facet model 105 and/or the machine-learned sentiment model 115.

Referring back to FIG. 1, it should be clear that whenever the machine-learned facet model 105 and/or the machine-learned sentiment model 115 has been updated, the facet and sentiment identification module 100 can then apply the updated facet model and/or the updated sentiment model to the sentiment-bearing content 110 (including both new and old sentiment-bearing content), with the result being a new or updated set of labelled facets and spans of conversational topics 120. This new or updated set of labelled facets and spans of conversational topics 120 can then be used, as summarized above, to populate updated conversational utterances 150.

Advantageously, updating the machine-learned facet model 105 and/or the machine-learned sentiment model 115 and the resulting conversational utterances 150 over time causes the Facet Recommender to adapt those conversational utterances to changing trends. For example, a conversational topic/facet combination that previously received mostly negative sentiment may begin to receive mostly positive sentiment, with the result being that corresponding conversational utterances 150 presented by the Facet Recommender may also change to reflect the change in sentiment. Similarly, facets associated with a particular conversational topic that at one point were frequently observed in the sentiment-bearing content 110 may cease to be referred to, or may be referred to with less frequency. In such cases, the resulting conversational utterances 150 may be updated to reflect such changing trends.

2.0 Operational Details of the Facet Recommender

The above-described program modules are employed for implementing various implementations of the Facet Recommender. As summarized above, the Facet Recommender provides various techniques for applying a machine-learned facet model and/or a machine-learned sentiment model to identify facets of conversational topics and optional corresponding sentiments from sentiment-bearing content, and to create recommendations in the form of conversational utterances from those facets for presentation to users. The following sections provide a detailed discussion of the operation of various implementations of the Facet Recommender, and of exemplary methods for implementing the program modules described in Section 1 with respect to FIG. 1 and FIG. 2. In particular, the following sections provides examples and operational details of various implementations of the Facet Recommender, including:

An operational overview of the Facet Recommender;
Exemplary processes for training machine-learned facet models and optional sentiment models;
Forming conversational topic baselines;
Populating conversational frameworks;
Selection and presentation of conversational utterances; and
Natural language queries.

2.1 Operational Overview:

As noted above, the Facet Recommender-based processes described herein provide various techniques for creating and presenting facet-based recommendations in the form of conversational utterances.

In various implementations, the Facet Recommender begins operation by applying a machine-learned facet model to sentiment-bearing content to identify facets of conversational topics associated with spans or segments of that content. The Facet Recommender also optionally uses the facet model and optional machine-learned sentiment-model to determine neutral, positive or negative consumer sentiment associated with those facets and, optionally, entities associated with those facets. In other words, spans or segments of the sentiment-bearing content are labelled according to both facet and optional sentiment. Further, it should also be noted that in various implementations, the facet model is capable of extracting multiple different instances of facets or other associated entities from single instances of sentiment-bearing content (e.g., a user review of a restaurant that refers to several different food items).

Similarly, in various implementations, the sentiment model is capable of extracting multiple different instances of sentiment associated with various facets from single instances of sentiment-bearing content.

Note that not all possible facets may be covered for a particular conversational topic, depending on the sentiment-bearing content available for processing by the machine-learned facet model and/or the machine-learned sentiment model. However, the number of covered facets for particular conversational topics tends to increase over time as more sentiment-bearing content becomes available. However, as noted above, the age of certain conversational topics, e.g., restaurants, sports, politics, etc., may be used as a factor to exclude or limit the influence of particular elements of the corresponding sentiment-bearing content.

Various concepts, words, things, people, etc., (collectively referred to herein as "entities") may also be associated with particular facets identified by the machine-learned facet model in the sentiment-bearing content. For example, the word span or text segment "crispy beef burrito" in a consumer review or other sentiment-bearing content may be identified as an entity corresponding to the food facet of the corresponding restaurant conversational topic. Similarly, entities associated with the food items facet for a particular Chinese restaurant conversational topic may include "kung pao shrimp," "almond chicken," "beef and broccoli", etc. Likewise, entities associated with an artist facet for a particular museum conversational topic may include particular artists, or particular artwork by particular artists. A simple example of this concept is to consider the "Museum of Modern Art in New York" as a conversational topic with a "Van Gogh" artist facet, and "The Starry Night" painting corresponding to an entity associated with that facet.

As noted above, in various implementations, the Facet Recommender also uses the machine-learned facet model and/or the machine-learned sentiment model to determine neutral, positive or negative sentiment associated with the facets, and optional corresponding entities, that have been identified in spans or segments of the sentiment-bearing content. Further, in various implementations, the Facet Recommender jointly evaluates one or more examples of particular facets (and optional corresponding entities) to determine consensus facets (i.e., multiple instances of the sentiment-bearing content referring to a particular facet) associated with a particular conversational topic. Similarly, in various implementations, the Facet Recommender optionally determines consensus sentiments associated with those facets and/or associated conversational topics.

For example, with respect to consensus sentiments, if the Facet Recommender determines that a majority of the sentiment-bearing content indicates a positive sentiment for the food facet for a particular restaurant conversational topic, then the Facet Recommender will associate a positive sentiment with food at that particular restaurant. Conversely, if the Facet Recommender determines that a majority of the sentiment-bearing content indicates a negative sentiment for the staff facet for a particular restaurant conversational topic, then the Facet Recommender will associate a negative sentiment with the staff at that particular restaurant.

The Facet Recommender then uses the resulting facets and, optionally, the corresponding sentiments for particular conversational topics to generate one or more new conversational utterances (i.e., short neutral, positive or negative suggestions) relating to particular facets at particular conversational topics based on the sentiments associated with those facets. More specifically, these new conversational utterances are generated by populating slots in various predefined conversational frameworks using labelled facets associated with particular conversational topics. For example, in the case of restaurants, conversational frameworks may be designed to provide simple slot-based suggestions, including but not limited to, "You should try the _____", "Avoid the _____", "The staff here is _____", "Parking is _____ here", "_____ is kid friendly", etc. Note also that conversational frameworks may include any number of multiple slots, e.g., "_____ has really good _____, but you should avoid the _____".

When considering sentiment, in the case that mostly positive reviews or sentiment have been received for a facet such as apple pie at a particular restaurant, new utterances generated using various conversational frameworks may include, "You should try the apple pie," or "The apple pie is very popular here." Conversely, if mostly negative reviews or sentiment has been received for a facet such as clam chowder at a particular restaurant, a new utterance generated using one of the conversational frameworks may be "Avoid the clam chowder."

The Facet Recommender then presents one or more of the resulting conversational utterances as text responses, speech-based responses, combined video and speech (e.g., talking avatars), or any desired combination of text, speech and video. Note also that in various implementations, the utterances provided as responses or suggestions by the Facet Recommender are personalized to individual users based on user preferences. Such user preferences may either be provided by the user or predicted based on anonymized past user behaviors. Examples of past user behaviors used to predict user preferences include, but are not limited to, browsing history, purchasing history, frequenting of establishments that specialize in particular facets, interests or preferences of known associates (e.g., friends, spouse, children, etc.), etc.

Further, in various implementations, conversational utterances are presented to users either reactively or proactively. For example, a user may provide a text or verbal query such as "What should I try?" to the Facet Recommender. In response, the Facet Recommender may return a conversational utterance of "The apple pie is very popular here." Similarly, if sensors associated with a portable computing device (e.g., a smartphone, tablet, etc.) indicate that a user has entered a bakery or restaurant specializing in desserts, the Facet Recommender may proactively alert the user by suggesting "You should try the apple pie."

In addition to personalization and proactive or reactive conversational utterances, in various implementations, the Facet Recommender uses one or more "grounding factors" to customize the conversational utterances provided as responses or suggestions. In other words, as discussed in further detail in Section 2.5.2 of this document, the Facet Recommender acts to tie conversational behavior of the utterances to various aspects of the user's current environment or circumstances, and not only persistent aspects associated with a user's history or current location. For example, in various implementations, the utterances generated by the Facet Recommender are based on grounding factors such as weather, time of day, local traffic, etc., and may further consider user history or current circumstances in combination with any environmental considerations or other grounding factors.

The above-summarized capabilities provide a number of advantages and technical effects, including, but not limited to, increased user interaction performance by reactively or proactively providing recommendations in the form of conversational utterances in response to user requests or user circumstances. The resulting efficiency improvements in user interactions saves the user time by reducing or eliminating the need for the user to manually determine or search for popular facets, or facets to be avoided, for particular conversational topics.

Further, in related implementations, the Facet Recommender augments existing content to visually indicate sentiment associated with particular facets such that users can rapidly determine which facets of a particular conversational topic are associated with either neutral, positive or negative sentiment. Advantageously, such implementations create user interactions that again save the user's time. Such implementations also increase the usability of recommendation systems implemented using the Facet Recommender, thereby again increasing user efficiency.

2.2 Exemplary Processes for Training Facet and Sentiment Models:

In various implementations, the Facet Recommender generates facet and optional sentiment models based on machine-learned named entity recognition models (NER) or any of a wide range of other machine-learning techniques. For example, NER-based models are generally learned through a training process that adapts chunking techniques combined with classification processes to learn the facet and/or sentiment models from training data. In general, text chunking provides an intermediate step towards full text parsing by dividing a text, such as a consumer review or other sentiment-bearing content, into syntactically correlated parts of words. The result is a multi-label multi-class supervised classification model, applicable to facets that are optionally combined with associated sentiment that may be used by the Facet Recommender as a facet model.

In further implementations, the Facet Recommender uses other machine-learning and classification techniques, including, but not limited to, the use of Semi-Markov Conditional Random Field (CRF) based techniques to learn facet models from the training data. In general, Semi-Markov CRF based techniques are adapted to provide a generalization of conditional random fields in a way that models variable length segmentations of label sequences of consumer reviews or other sentiment-bearing content to learn a facet model that is applicable to facets that are optionally combined with associated sentiment in sentiment-bearing content.

Further, as noted above, in various implementations, the Facet Recommender may use an optional machine-learned sentiment model to identify sentiment (or lack thereof) in the sentiment-bearing content. In general, the machine-learned sentiment model may be trained by applying a variety of machine-learning techniques that may be similar to, or distinct from, those described for training of the machine-learned facet model.

For example, in various implementations, the Facet Recommender applies a logistic regression-based machine-learning approach to train the sentiment model. In various implementations, this logistic regression-based training approach receives a large number of samples of labeled instances of "positive", "negative", and "neutral" examples of "sentiment vocabulary," including text, images, emoticons, etc., associated with various instances of sentiment-bearing content. This training process then learns weights on features (including individual elements of sentiment vocabulary) in the sentiment-bearing content. This learning process then operates to maximize a conditional log likelihood of the labelled training data to construct the machine-learned sentiment model.

In other implementations, the Facet Recommender applies an adaptive recursive neural network for target-dependent sentiment classification. In various implementations, this neural network-based machine learning approach adaptively propagates the sentiments of the words, images, text, etc., of the sentiment vocabulary to target sentiments depending on the context and syntactic relationships between those elements of the sentiment vocabulary. In various implementations, this neural network-based machine learning approach applies multiple composition functions, and then models the adaptive sentiment propagations as distributions over those composition functions. Further, in various implementations, this neural network-based machine learning approach may also make use of a manually annotated dataset for target-dependent sentiment analysis for arbitrary sets or sources of sentiment bearing content.

For purposes of explanation, the following discussion provides simple examples of various implementations for using labelled training data to train a Semi-Markov CRF based probabilistic facet model. However, it should be understood that the Facet Recommender is not intended to be limited to the use of Semi-Markov CRF based modeling techniques, NER-based modeling techniques, or any other particular machine-learning techniques. Further, it should also be understood that any desired machine-learning technique may be adapted for use in constructing, training, learning, or otherwise generating statistical or probabilistic facet models capable of identifying or otherwise extracting facets and optionally corresponding sentiment from arbitrary sentiment-bearing content, or from labelled training data derived from such content.

2.2.1 Facets:

As noted above, the term "facet" is defined as referring to specific characteristics or entities associated with particular conversational topics. Examples of facets include, but are not limited to, restaurant type (e.g., Italian, gluten free, vegetarian, Brazilian barbecue, etc.), menus, food items (or particular categories or types of food items), drinks, service, staff, atmosphere, amenities, entertainment, games, customers, events, price, wait times, freshness, etc. For example, a food items facet for a particular restaurant conversational topic may include words or phrases such as "apple pie," "steak," "Cobb salad," "shrimp scampi," "grilled salmon," etc. Note also that some facets may include sub-facets, e.g., a "food" facet may include sub-facets of beef, seafood, poultry, vegetarian, etc., each of which may also be individually treated as a facet.

While the content of the above-noted facets can be considered self-explanatory, the following provides some additional simple examples of some of these facets for purposes of explanation. For example, food and drink facets generally include dishes or meals and types of drinks and general categories (or sub-facets) of food and drink associated with a particular conversational topic. Staff facets generally include people who work or volunteer at a venue associated with a particular conversational topic. Amenities facets generally include things or activities offered by a venue associated with a particular conversational topic. Events facets typically include things that customers do at the venue and things happening at the venue (e.g., bands, dancing, games, etc.). Customers facets typically include the types of people (e.g., age, demeanor, education, etc.) who are generally found at a particular venue associated with a particular conversational topic.

2.2.2 Sentiment Identifiers in Sentiment-Bearing Content:

As noted above, in various implementations, the Facet Recommender uses a "sentiment vocabulary" to determine sentiment for a particular conversational topic or facet. In various implementations, the sentiment vocabulary is defined by words or phrases associated with neutral, positive or negative sentiment, by indications of neutral, positive or negative sentiment presented in the form of any emotion-based or related emoticons or images, or by textual portrayals of a person's mood or facial expression (e.g., "8-)" may indicate a positive sentiment).

For example, in the case of positive sentiment, the sentiment vocabulary is associated with words that include, but are clearly not limited to, "great," "fantastic," "amazing," "wonderful," "the best," "really good," "out of this world," and so on. Conversely, in the case of negative sentiment, words or phrases defining the sentiment vocabulary include, but are clearly not limited to, "terrible," "nasty," "awful," "rude," "can't stomach this," and so on.

Examples of neutral sentiment include, but are not limited to expressions such as "OK," "so-so," etc. Further, a neutral sentiment for a particular facet or conversational topic may also be indicated by a lack of evident sentiment, or a relatively equivalent mix of both positive and negative sentiment in any sentiment-bearing content associated with a particular facet or conversational topic.

Note also that fanciful words or intentional misspellings (e.g., "Sooooo Gooood!!!," or "Baaaaaad") may be used be used to define the sentiment vocabulary to indicate corresponding neutral, positive or negative sentiment in sentiment-bearing content. In addition, in various implementations, the sentiment vocabulary is further defined by texting type acronyms, with or without punctuation (e.g., "OMG!!!," "GR8," etc.).

Further, as noted above, in various implementations, the sentiment vocabulary is further defined by indications of neutral, positive or negative sentiment presented in the form of any emotion-based or related emoticons or images. For example, a text span of "bacon cheeseburger" (i.e., a food facet of a particular conversational topic) combined with an image of a smiley face (i.e., positive sentiment) will indicate a positive sentiment for a food/"bacon cheeseburger" facet of a particular conversational topic. More generally, an image or emoticon of a smiling face or the like will indicate good or happy (i.e., positive sentiment), while an image or emoticon of a frowning face will indicate bad or unhappy (i.e., negative sentiment) in sentiment-bearing content. Similarly, in various implementations, the sentiment vocabulary is further defined by textual portrayals of a person's mood or facial expression. For example, the text string "8-)" may indicate happy (i.e., positive sentiment), while the text string ":-\" may indicate skeptical or annoyed (i.e., negative sentiment) in sentiment-bearing content.

With respect to sentiment, it should be noted that even in the case where no sentiment vocabulary exists, various automated techniques (e.g., Brown clustering, for example) can be used to cluster similar facets derived from sentiment-bearing content. Such clusters can then be subsequently labelled (either manually or via various machine-learning techniques) as having either neutral, positive or negative sentiments. A sentiment vocabulary can then be being extracted, learned, or otherwise constructed from those labelled clusters.

2.2.3 Training Data:

Regardless of the type of machine-learning processes used for constructing, training, learning, or otherwise generating statistical or probabilistic facet models and/or sentiment models, the training data used for such purposes often includes various combinations of data. For example, such data includes, but is not limited to, automatically clustered sentiment-bearing content, spectral embeddings learned from the clusters, automatic or hand annotated or labelled clusters to identify words for facets and for optional neutral, positive, or negative sentiment vocabulary, various features such as capitalization features, character n-grams, relative positions of words or characters appearing in a span or segment of sentiment-bearing content, etc.

In general, this training data is derived from sentiment bearing content obtained from a variety of sources. Such sources include, but are not limited to, online consumer reviews, social media content (e.g., text, image, speech, or video-based content, or any combination thereof), or any other online opinion-bearing content. Derivation or updating of a training data set from sentiment-bearing content can be accomplished by applying any desired data collection and labelling technique, including both machine-learning based techniques, manual or crowdsourcing-based techniques, or any combination thereof.

For example, in various implementations, portions of the training data is collected by applying various crowdsourcing-based techniques. These crowdsourcing-based techniques operate in the form of a marketplace that connects large worker pools from various locations with human intelligence tasks. In the case of the Facet Recommender, such tasks include identifying and labeling relevant spans in sentiment-bearing content received from a variety of sources to indicate either or both facets and sentiment.

In a tested implementation, the Facet Recommender used crowdsourced evaluations of a large sample of sentiment-bearing content, with each instance of sentiment-bearing content being provided to multiple workers. Workers then identified spans representing particular facets, and labelled those facets with both facet type and an associated sentiment. The Facet Recommender then evaluated the resulting spans and labels to identify a subset of the crowdsourced evaluation that had agreement (i.e., consensus) in either or both facet type and sentiment between two or more crowdsourced workers for particular facets. For example, if a sufficient number of crowdsourced workers agreed that a particular food facet (i.e., facet consensus) existed at a particular venue associated with a particular conversational topic then the corresponding labelled information was added the training data set. Similarly, sentiment consensus where two or more crowdsourced workers agreed on a particular sentiment (i.e., consensus sentiment) then the corresponding labelled sentiment information was added to the training data set.

Crowdsourcing techniques may also be augmented by a variety of machine-learning techniques to generate the training data set. For example, in various implementations, facet and/or sentiment labelling is accomplished by first defining types of facets or entities to extract, either automatically or via machine-learning based techniques, and identifying a sentiment vocabulary associated with neutral, positive, or negative sentiments. For example, techniques used to identify or define facets or entities include, but are not limited to, extracting noun phrases representing spans corresponding to various types of predefined or automatically defined facets.

In various implementations, the process for generating the training data set begins by using any existing sentiment-bearing content to form language-based n-gram clusters. These n-gram clusters are learned from various clustering methods, including, but not limited to, "Brown clustering" or other clustering techniques. The Facet Recommender then processes these language-based n-gram clusters to learn spectral embeddings. The language-based n-gram clusters are then optionally annotated (either manually or via various machine-learning based techniques) to identify words for facets and neutral, positive, or negative vocabulary for the sentiment to generate the training data set.

In addition to forming language-based n-gram clusters, the Facet Recommender also applies any of a variety of techniques to generate labels for spans (i.e., selected segments) of the sentiment-bearing content corresponding to particular facets. For example, the review "On Thursday nights, this place has great prime rib dinners" may include the span "great prime rib". As such, the resulting label for this span may include a "food" facet (i.e., "prime rib") and a positive sentiment (i.e., "great"). Such labels can be generated by applying techniques including, but not limited to, crowdsourcing studies or various machine-learning techniques to identify spans and generate corresponding labels from sentiment-bearing content.

In further implementations, the Facet Recommender uses various approaches to reduce noise in the training data. For example, in various implementations, the Facet Recommender uses various topic-modeling techniques, such as, for example a latent Dirichlet allocation (LDA) generative model that allows sets of observations to be explained by unobserved groups to explain why some parts of the data are similar. This enables the Facet Recommender to separate background vocabulary from content associated with a particular conversational topic, and to discover topics, thus helping to increases the effectiveness of the training data. In other implementations, the Facet Recommender uses Brown clustering to replace each word in sentiment-bearing segments with a cluster label from Brown clusters trained on existing review data. In the case of restaurant conversational topics, such many clusters tend to correspond to restaurant facets such as desserts, alcoholic drinks, locations, etc., thereby again helping to increases the effectiveness of the training data.

2.2.4 Training a Semi-Markov CRF Based Facet Model:

As noted above, in various implementations, training data was derived from sentiment-bearing content by applying various techniques including but not limited to, machine-learning based labeling techniques and crowdsourcing-based techniques, or some combination thereof. In various implementations, the result of this process is a training data set that includes sets of features that represent lexical features of segments (e.g., individual words or phrases), and the segment context (e.g., capitalization patterns, punctuation, character n-grams, etc.), and optional associated sentiment. These features may also include unsupervised word representations identified via various techniques. For example, language-based techniques such as Brown clustering were used in various implementations to group distributionally similar words in sentiment-bearing content based on their contexts to form language-based n-gram clusters. Other language-based techniques, including, but not limited to two-step Canonical Correlation Analysis (CCA) of language-based n-gram clusters were then used to learn spectral embeddings.

In various implementations, the Facet Recommender constructed the facet model as a Semi-Markov CRF that was trained on a large set of labelled training data that included features such as those described above. Note that Semi-Markov CRF based models are known to those skilled in the art, and will not be described in detail herein.

Unlike regular Markov CRF based models, semi-Markov CRF based models can measure properties of segments, rather than individual words, thereby enabling the use of unsupervised phrase representations to improve NER performance. In various implementations, the Facet Recommender further adapts semi-Markov CRF based techniques to jointly perform segmentation and recognition of sentiment-bearing content by first finding representations for possible sequences. Further, in various implementations, two-step CCA processes used by the Facet Recommender for phrase embeddings provide improved facet recognition or identification by weighting the facet model towards facet or entity names or phrases likely to be of higher interest to a user.

For example, in various implementations, a "line dancing" facet may be of higher interest than a "parking" facet for a particular venue associated with a particular conversational topic. However, in various implementations, the facet model may still seek to find both such facets if both were in the sentiment-bearing content. As such, the resulting facet model doesn't "prefer" one facet over the other. However, in various implementations, the facet model may assign a lower probability to one facet, or may miss it entirely if features extracted from an instance of the sentiment-bearing content don't provide the facet model with enough information to make a facet classification.

2.3 Forming Conversational Topic Baselines:

In various implementations, the Facet Recommender forms a baseline for each conversational topic via extractive summarization of sentiment-bearing content via the machine-learned facet model and/or the machine-learned sentiment model. More specifically, such baselines may be formed by evaluating the labelled facets and spans of conversational topics output by the machine-learned facet model and/or the machine-learned sentiment model to determine a general consensus of how people feel (i.e., consensus sentiments) about a particular conversational topic and to identify relevant facets of that conversational topic that multiple people may be commenting on (i.e., consensus facets). Examples of extractive summarization techniques include, but are not limited to, consensus-based summarization, clustering, etc., as discussed in the following paragraphs. The result of such methods is to determine an overall facet consensus and/or sentiment consensus for facets that tend to be more relevant to users.

In various implementations, the Facet Recommender then limits the population or completion of the conversational utterances to facets having consensus facets and optional corresponding consensus sentiments. For example, in cases where a particular facet has relatively few reviews in the available sentiment-bearing content, in some cases, the Facet Recommender may not use such facets to populate conversational utterances for presentation to users. Advantageously, this ensures that conversational utterances presented to the users are more likely to be both relevant and accurate.

For example, with respect to either or both consensus facets or consensus sentiments, in various implementations, the Facet Recommender determines consensus facets or consensus sentiments from sentiment-bearing content by considering the most frequent words or phrases used to identify particular facets (i.e., for consensus facets) or sentiment vocabulary (i.e., for consensus sentiments) by applying probabilistic techniques such as SumBasic-based methods. In general, Sum Basic-based methods are adapted for use by the Facet Recommender based on the observation that particular related words or phrases for consensus facets, or sentiment vocabulary for consensus sentiments, tend to occur with higher probability in clusters of sentiment-bearing content generated by human reviewers. Equation (1) defines an exemplary Sum Basic method for selecting tips (i.e., facets and/or associated sentiments) with words or phrases associated with consensus facets, or "words" of the sentiment vocabulary associated with consensus sentiments that are frequently observed in the tips for a particular conversational topic (referred to as "topic" in the following equation:

$$\text{Score(tip)} = \sum_{word \in tip} \frac{1}{|tip|} p(word|topic) \qquad \text{Eqn. (1)}$$

In further implementations, the Facet Recommender determines consensus facets or consensus sentiments from sentiment-bearing content by adapting processes for minimizing a Kullback-Leibler (KL) divergence with each selection by applying techniques such as KLSum-based methods. For example, Equation (2) defines an exemplary KLSum-based method for selecting tips that minimizes KL divergence from a unigram model of all tips for a particular conversational topic based on the words or phrases associated with consensus facets, or "words" of the sentiment vocabulary associated consensus sentiment of particular facets for a particular conversational topic (referred to as "topic" in the following equation):

$$\text{summary} = \min_{summary} \sum_{word} p(word|topic) \log \frac{p(word|topic)}{p(word|summary)} \qquad \text{Eqn. (2)}$$

In further implementations, the Facet Recommender determines consensus facets and/or consensus sentiments from sentiment-bearing content by applying clustering-based techniques (e.g., Brown clusters, k-means clustering, etc.) in combination with techniques such as KLSum- or Sum Basic-based methods, for example, using limited numbers of tips and clusters. More specifically in various implementations, the Facet Recommender first generates clusters of tips (i.e., facets and/or sentiments) for particular conversational topics, and then evaluates words or phrases associated with a predefined or user selected number of tips from each of some predefined or user selected number of the largest clusters. Again, the result of such methods is to determine an overall facet consensus or sentiment consensus for facets and/or sentiments that tend to be more relevant to users.

2.4 Populating Conversational Frameworks:

As noted above, in various implementations, a variety of conversational frameworks are provided to form new utterances based on facets identified for particular conversational topics and, optionally, the neutral, positive or negative sentiment associated with those facets and conversational topics. In order to fill or populate these conversational frameworks, in various implementations, the Facet Recommender extracts or otherwise identifies various entities (e.g., "crispy beef burrito", "kung pao shrimp", "hot and sour noodle soup", etc.) associated with various facets. Depending on the conversational frameworks, and the associated sentiment, the Facet Recommender then uses those facets or entities to fill or complete various conversational frameworks, e.g., "Try the crispy beef burrito"; or "The hot and sour noodle soup is very spicy here."

Note that neutral conversational frameworks represent frameworks that do not inherently express a positive or negative sentiment, but that could be populated with labelled facets that cause them to either remain neutral or to express positive or negative sentiment. For example, consider the neutral conversational framework, "They have _____ here." This neutral framework could be populated with a facet such as, for example, "bad service" to create a negative conversational utterance, or "good French fries" to create a positive conversational utterance, or just "French fries", to create a neutral conversational utterance.

More specifically, in various implementations, the machine-learned facet model and/or the machine-learned sentiment model is applied to new sentiment-bearing content to identify facets in that content, with the associated sentiment vocabulary being used to optionally identify sentiment corresponding to those facets or to the corresponding conversational topic. The result of this processing of sentiment-bearing content via the facet model and/or the machine-learned sentiment model is a set of labelled facets and optional associated sentiments for particular conversational topics. As discussed above in Section 2.3, in various implementations, these labelled facets and associated sentiments are further evaluated to determine a consensus facet and/or consensus sentiment for those facets or conversational topics. One or more of the labelled facets (or a subset of the labelled facets corresponding to consensus facets or consensus sentiments) are then fit or plugged into slots in corresponding neutral, positive, or negative conversational frameworks.

Further, in related implementations, an n-gram language model or the like is used to determine appropriate words to be used at boundaries between the predefined conversational frameworks and the slot filled by particular facets or entities associated with those facets, or sentiments. For example, the n-gram language model can choose or select between words such as "a", "an", "the", "some", or any of a large variety of other boundary words or phrases that meet any desired linguistic style (i.e., linguistic styles, dialects, slang, colloquialisms, etc.) that has been modelled, whether or not that linguistic style is grammatically correct. For example, consider populating the conversational framework "You should try _____ here" with the facets of "tacos" and "ice cream sundae," both having positive sentiment in this example. In this example, the resulting conversational utterances will use different boundary words for each facet, e.g., "You should try some tacos here" or "You should try an ice cream sundae here."

Note that conversational frameworks may also include means for augmenting existing content to indicate sentiment associated with such content using predefined text effects and/or images, and displaying that augmented content via a display device (e.g., a smartphone screen, a projective overlay on an physical menu, etc.). For example, in various implementations, the Facet Recommender highlights or otherwise augments existing content such as, for example, a restaurant menu, by automatically applying effects such as changes to color, text style or size, images or icons, etc. For example, menu choices (representing facets of a particular restaurant conversational topic) associated with a positive sentiment may be bolded, highlighted, augmented by a smiley face icon, etc. Conversely, menu choices associated with a negative sentiment may be blacked out, faded, augmented by images or icons such as a frowning face, a stop sign, a skull and crossbones, etc. Advantageously, this allows users to quickly determine popular and unpopular choices or facets with a quick glance at the augmented menu.

2.4.1 Personality-Based Utterances and Language Models:

In various implementations, one or more conversational frameworks are adapted or translated to match or fit conversational utterances, and/or the corresponding conversational frameworks, to any combination of particular linguistic styles (i.e., linguistic styles, dialects, slang, colloquialisms, etc.). Advantageously, this enables to Facet Recommender to present conversational utterances by automatically applying linguistic styles that appear to have been generated by the same person or personality. For example, the conversational utterance "You should try the chicken" is linguistically equivalent to "Y'all gotta try the chicken," although both such utterances clearly use different linguistic styles that appear to have originated from a different person or personality.

In various implementations, users are provided with a user interface to select from one or more predefined personality types associated with particular linguistic styles, or to simply use or accept a default personality type. The result of such selections is that any conversational utterances presented by the Facet Recommender will maintain consistent linguistic styles. Note also that in various implementations, users are presented with a user interface to enter, edit, or otherwise create any combination of user-defined linguistic styles for use by the Facet Recommender.

In various implementations, conversational frameworks or the resulting conversational utterances are hand curated or created to provide consistent linguistic styles. In such cases, different sets or databases can be constructed having conversational utterances that are fit to corresponding linguistic styles. However, it should be appreciated that a variety of existing language translation models and the like can be adapted for use by the Facet Recommender to "translate" existing conversational utterances or conversational frameworks to use corresponding linguistic styles within the same language (or to a different language).

For example, various implementations of the Facet Recommender adapt models, including but not limited to, phrase-level Hidden Markov Model (HMM) based word alignment models for translation-based purposes. These types of models enable various word alignment and phrase-based machine translation tasks. These tasks include, for example, translating phrases or sentences from one language to another language, or from one language to alternate phrases or sentences using any combination of different linguistic styles in the same language.

Note also that conversational utterances may be presented via text or speech-based responses, or as combined text, speech and/or video such as a digital avatar or the like. Note that "avatars," as defined herein, may be represented by any combination of text, speech, and/or video. For example, avatars, as defined herein, may include animated or photo-realistic humans, robots, animals, aliens, or fanciful creatures, animated shapes with an associated voice or text, voice with no corresponding text or visuals, and fixed or scrolling text. Further, avatars may be provided or presented via any combination of display and/or audio output mechanisms.

Depending on the output means used to present conversational utterances, any combination of features or attributes including, but not limited to, language, linguistic style, accent, voice type, emotional context, age, gender, appearance, etc., associated with speech-based or avatar-based responses may be set to a default state or selected via a user interface. For example, a user may prefer to have conversational utterances presented via the display of a smartphone or the like in speech corresponding to a young woman in the form of an artificial intelligence (AI) based digital avatar that uses British colloquialisms while speaking in an American English accent.

2.5 Selection and Presentation of Conversational Utterances:

As noted above, the Facet Recommender selects and presents one or more conversational utterances that are relevant to particular users via various output mechanisms (e.g., text, speech, video, etc.), or combinations of such output mechanisms. Further, as discussed above in Section 2.4.1 of this document, in various implementations, the conversational utterances presented to the user are provided by applying consistent linguistic styles (i.e., linguistic styles, dialects, slang, colloquialisms, etc.) that are either set to a default state, or otherwise selected or customized by the user. In addition, in various implementations, the Facet Recommender determines relevancy based on any combination of user profile information and grounding factors, as discussed in further detail below in Sections 2.5.1 and 2.5.2, respectively.

Determination of relevancy of utterances to a particular user may also be reactive or proactive, and may be based on any of a combination of factors. Examples of reactive factors for determining relevancy for particular utterances, include, but are not limited to, reactive utterances in response to a user question or query presented to the Facet Recommender via text inputs (e.g., "Where can I find a good steak?"), speech inputs, or any of a wide range of natural user interface (NUI)-based inputs (e.g., track the user's eyes or user touch- or gesture-based inputs to an image of a steak, and then suggest a good steak at a nearby restaurant). Examples of proactive factors for determining relevancy for particular utterances, include, but are not limited to, presenting utterances based on user location, time of day, past user behaviors or history, etc.

2.5.1 Profile Based Presentations:

As noted above, in various implementations, the Facet Recommender considers a user profile or other user personalization information to select one or more relevant conversational utterances for presentation to the user. Examples of user profile or other user personalization information includes, but is not limited to, profile information derived from past user behaviors, interests or preferences of current or known associates, etc. For example, if the user has expressed a preference, or corresponding user behavior has been observed, that indicates the user consistently visits museums or art galleries on Friday afternoons, then that information may be included in the user profile. Then, conversational utterance for popular nearby museums or art galleries may be proactively presented to the user on Friday afternoons based on the user's current or expected location. User profiles may also include preferences for use of particular linguistic styles (i.e., linguistic styles, dialects, slang, colloquialisms, etc.) associated with particular personality types as discussed above in Section 2.4.1.

2.5.2 Grounding Factor Based Presentations:

In further implementations, the Facet Recommender considers various grounding factors, either alone or in combination with the user profile or other user personalization information, to select one or more relevant conversational utterances for presentation to the user. Examples of grounding information includes, but is not limited to weather, time of day, local traffic, audio, (e.g., is it quiet or noisy at a particular location), vision (e.g., a video, with or without audio content, relating to any conversational topic, such as, for example, a play, a team, or a particular athlete, in a soccer game), etc.

For example, on a nice warm afternoon in August, the Facet Recommender may present a conversational utterance to inform a user asking about, or currently entering, a particular restaurant that "There are tables outside with a great view of the lake." Conversely, on a sleet-filled January evening, the Facet Recommender would likely not present such an utterance when considering weather as a grounding factor.

Further, as noted above, in various implementations, the Facet Recommender considers a combination of both the user profile and one or more available grounding factors. For example, a user's profile or preferences may indicate that the user has young children, and that the user prefers to receive suggestions for child-friendly restaurants or shopping options. In this case, depending on the user's current location or other current circumstances, the Facet Recommender may suggest something such as "Kids love climbing through the giant gerbil tubes at the Cheesy Cheese Pizza Palace!" Conversely, the weekday dining or shopping history of that user, based on various information, such as GPS position tracking or query history, for example, may indicate that the user exclusively engages in adult-oriented shopping and dining on weekdays or when the user is near her workplace. In such cases, the Facet Recommender will disregard or give less weight to the user preferences and respond with utterances that are more appropriate for the user's current environment and circumstances or other grounding factors.

2.6 Natural Language Queries and QA Systems:

As discussed above, in various implementations, the Facet Recommender creates a set of labelled facets and spans of conversational topics and optional associated sentiments. Further, in various implementations, the Facet Recommender also creates a set of conversational utterances, which optionally indicate any of neutral, positive, or negative sentiment. Advantageously, the labelled data and the resulting conversational utterances enable a variety of additional applications that result in the technical effect of improving user efficiency through responsive access to relevant information relating to a wide range of conversational topics.

More specifically, in various implementations, the Facet Recommender provides any combination of a natural language processing (NLP) based query system, a structured language query system, or a search-engine based query system for interacting with and retrieving information from the labelled facets and spans and optional associated sentiments, and/or from the conversational utterances. Note that for purposes of discussion, these labelled facets and spans and optional associated sentiments, and/or the conversational utterances may be collectively referred to in some of the following paragraphs as "topic data."

For example, in various implementations, the Facet Recommender provides a user interface that receives any combination of user inputs including, but not limited to, written inputs (via real or virtual keyboard and/or pointing device-based inputs), spoken inputs, gestural inputs, or other NUI-based inputs, to request, retrieve, and/or search information from the topic data. In various implementations, the topic data inherently provides a facet-based structure representing large numbers of conversational topics and optional associated sentiments.

Consequently, in various implementations, this topic data may be considered as representing a mapping of particular spans or segments of the sentiment-bearing content to a structured database or the like. As such, this structured database of topic data includes information that directly associates facets and optional sentiments with particular conversational topics, and that also optionally includes information identifying consensus facets and/or consensus sentiments associated with particular facets or conversational topics.

Figure 3:
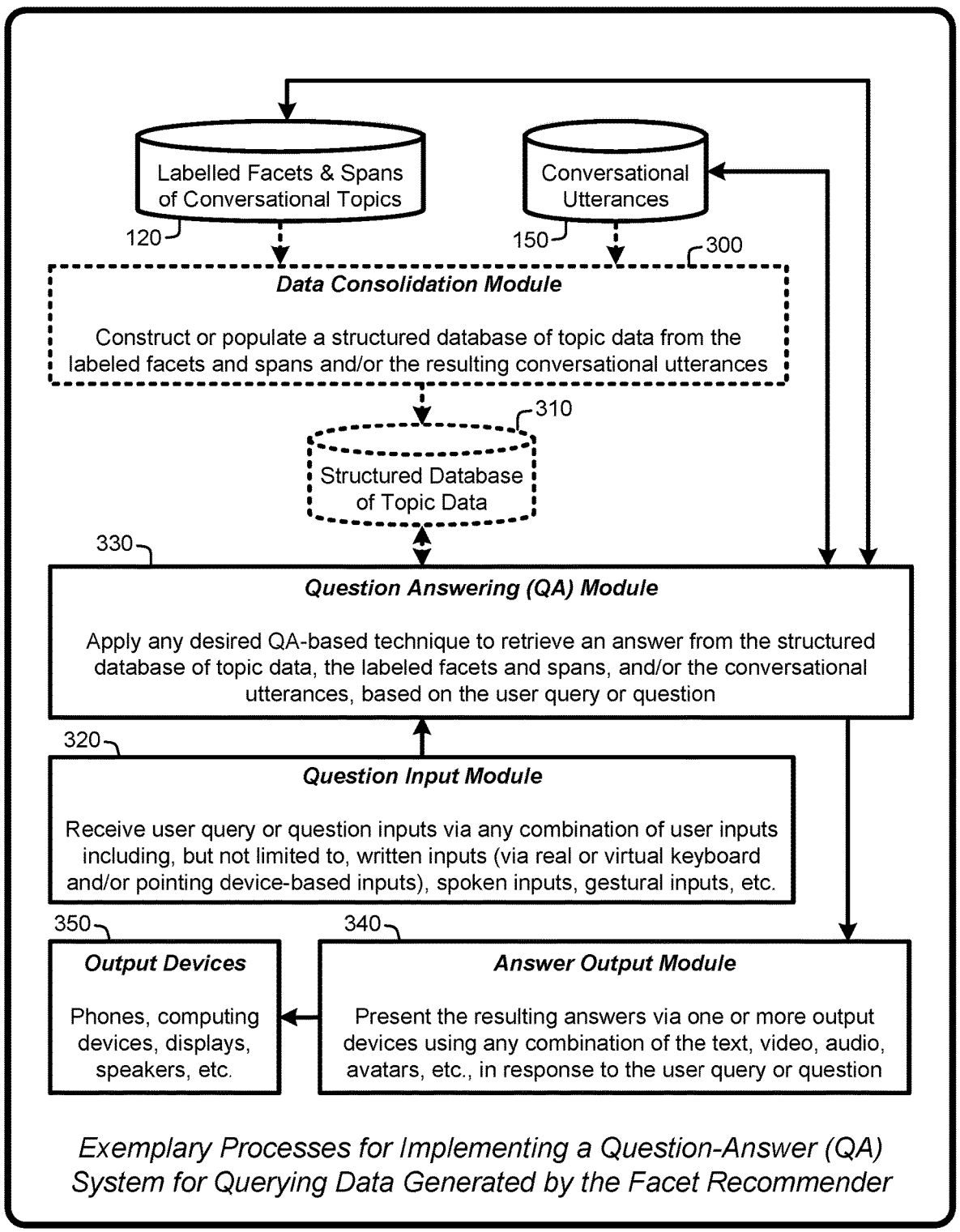
FIG. 3 provides an exemplary architectural flow diagram that illustrates program modules showing various exemplary processes for using question-answer (QA) processes to query a structured database of topic data generated by the Facet Recommender, as described herein.

In various implementations, the Facet Recommender applies any of a wide range of query techniques, such as NLP-based techniques, search-engine-based techniques, etc., to direct questions at the structured database of topic data, as illustrated by FIG. 3. Note that FIG. 3 is not intended to be an exhaustive representation of all of the various implementations of the Facet Recommender described herein, and that the implementations represented in FIG. 3 are provided only for purposes of explanation. Further, it should be noted that any boxes and interconnections between boxes that are represented by broken or dashed lines in FIG. 3 represent optional or alternate implementations of the Facet Recommender described herein, and that any or all of these optional or alternate implementations, as described below, may be used in combination with other alternate implementations that are described throughout this document.

In various implementations, as illustrated by FIG. 3, the Facet Recommender uses an optional data consolidation module 300 to construct or populate a structured database of topic data 310 from the labeled facets and spans of conversational topics 120 and/or the resulting conversational utterances 150. In other words, the data consolidation module 300 consolidates and formats the topic data 310 for use by whichever query technique is being used by the Facet Recommender.

A question input module 320 may receive user query or question inputs via any combination of user inputs including, but not limited to, written inputs (via real or virtual keyboard and/or pointing device-based inputs), spoken inputs, gestural inputs, or any other NUI-based input. In various implementations, a question-answering (QA) module 330 then applies the user query or question to any of the structured database of topic data 310, the labeled facets and spans of conversational topics 120 and/or the conversational utterances 150 to retrieve an answer. More specifically, the QA module 330 applies any desired QA-based technique to retrieve an answer from the structured database of topic data 310, the labeled facets and spans of conversational topics 120 and/or the conversational utterances 150, based on the user query or question.

In various implementations, an answer output module 340 then presents the resulting answers via one or more output devices 350. The answer output module 340 applies any combination of the techniques described above (e.g., text, video, audio, avatars, etc.) to output the answers in response to the user query or question. As such, this means that in various implementations, the Facet Recommender provides a QA capability into a free-flowing dialog system centered on sentiment-bearing content derived from any of a plurality of sources.

Such implementations enable the user to query the QA interface of the Facet Recommender to ask questions, such as, for example, "What do people think of the ambience at the Cheesy Cheese Pizza Palace?" or "Do people like the pizza here?" The Facet Recommender may then use any desired combination of NLP-based techniques, or other database search- or query-based techniques to obtain an answer from the structured database of topic data, or from the labeled facets and spans of conversational topics and/or the resulting conversational utterances.

In various implementations, the answer is returned in the form of one or more of the conversational utterances generated by the Facet Recommender, using any combination of the techniques described above (e.g., text, video, audio, avatars, etc.). However, the QA interface of the Facet Recommender can also pull or infer answers directly from the labelled facets and spans and optional associated sentiments, and present the resulting answers in a structured format or as a natural language response, e.g., "Most people tend to really like the pizza here, but there have been some recent negative reviews." Again, such answers can be presented using any combination of the techniques described above (e.g., text, video, audio, avatars, etc.)

3.0 Operational Summary of the Facet Recommender

Figure 4:
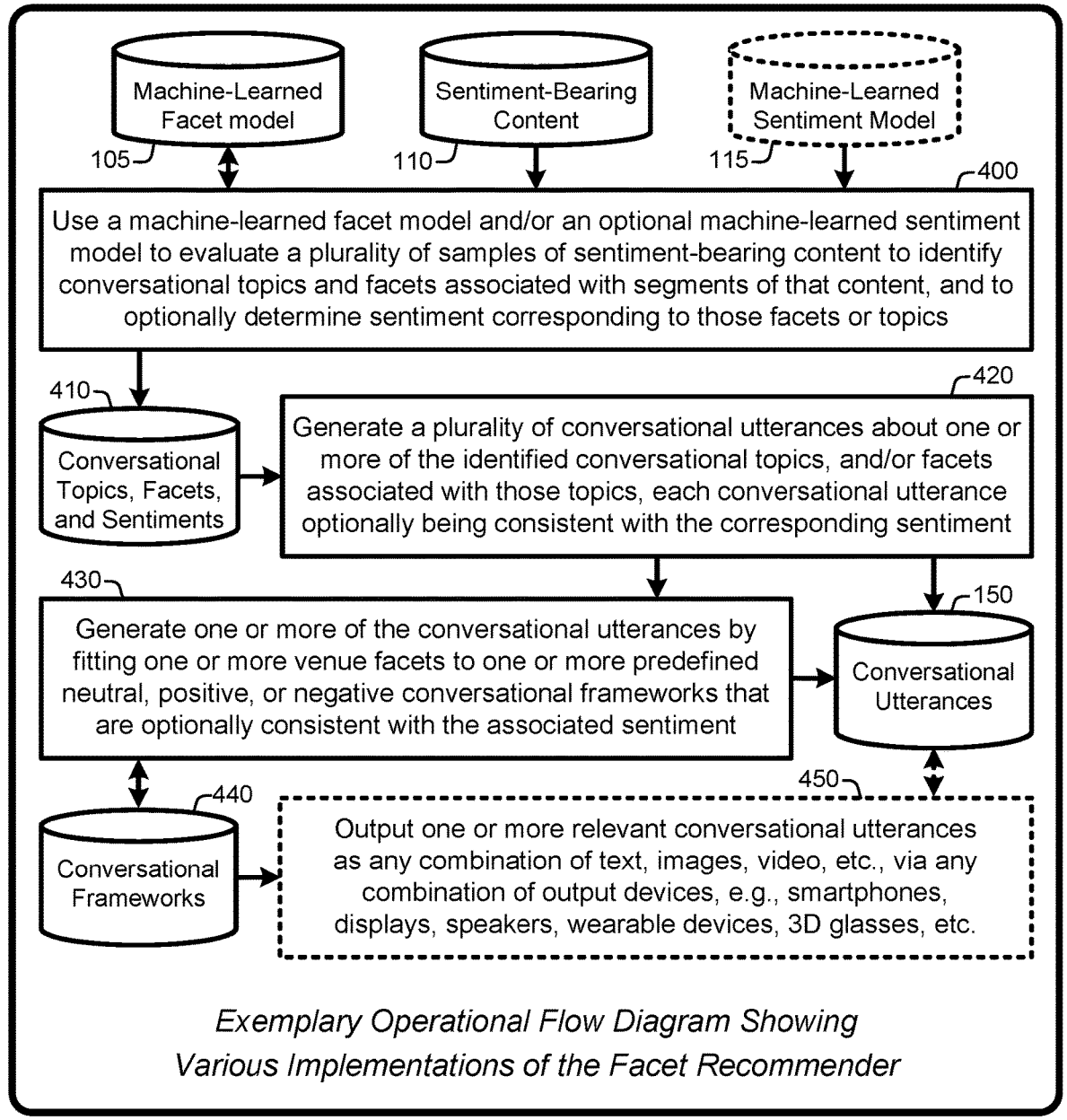
FIG. 4 illustrates a general system flow diagram that illustrates exemplary methods for effecting various implementations of the Facet Recommender, as described herein.

The processes described above with respect to FIG. 1 through FIG. 3, and in further view of the detailed description provided above in Sections 1 and 2, are illustrated by the general operational flow diagram of FIG. 4. In particular, FIG. 4 provides an exemplary operational flow diagram that summarizes the operation of some of the various implementations of the Facet Recommender. Note that FIG. 4 is not intended to be an exhaustive representation of all of the various implementations of the Facet Recommender described herein, and that the implementations represented in FIG. 4 are provided only for purposes of explanation.

Further, it should be noted that any boxes and interconnections between boxes that are represented by broken or dashed lines in FIG. 4 represent optional or alternate implementations of the Facet Recommender described herein, and that any or all of these optional or alternate implementations, as described below, may be used in combination with other alternate implementations that are described throughout this document.

In general, as illustrated by FIG. 4, in various implementations, the Facet Recommender may begin operation by applying the machine-learned facet model 105 and/or the machine-learned sentiment model 115 to evaluate 400 a plurality of samples or instances of sentiment-bearing content 110 to identify conversational topics, facets and optional sentiments 410 associated with one or more facets or segments of that content, and/or sentiment associated with one or more of the conversational topics.

The Facet Recommender then generates 420 a plurality of conversational utterances 150 about one or more of the identified conversational topics, facets and optional sentiments 410, each of the conversational utterances optionally being consistent with the corresponding sentiment. Further, one or more of the conversational utterances 150 are generated 430 by optionally fitting one or more identified conversational topics, facets and optional sentiments 310 to one or more predefined conversational frameworks 440 that are consistent with the associated sentiment.

Finally, in various implementations, the Facet Recommender outputs 450 or otherwise presents one or more relevant conversational utterances 150 as any combination of text, images, video, digital avatars, etc., via any combination of output devices, e.g., smartphones, displays, speakers, wearable devices, 2D or 3D video glasses, heads-up display devices, etc.

4.0 Claim Support

The following paragraphs summarize various examples of implementations which may be claimed in the present document. However, it should be understood that the implementations summarized below are not intended to limit the subject matter which may be claimed in view of the detailed description of the Facet Recommender. Further, any or all of the implementations summarized below may be claimed in any desired combination with some or all of the implementations described throughout the detailed description and any implementations illustrated in one or more of the figures, and any other implementations described below. In addition, it should be noted that the following implementations are intended to be understood in view of the detailed description and figures described throughout this document.

In various implementations, a Facet Recommender is implemented by means for generating conversational utterances from sentiment-bearing content.

For example, in various implementations, generation of conversational utterances is provided via means, processes or techniques for applying a machine-learned facet model to evaluate a plurality of samples of sentiment-bearing content to identify conversational topics and facets associated with one or more segments of that content. This information is then evaluated to identify one or more of the facets that have a consensus based on two or more samples of the sentiment-bearing content. The resulting consensus information is then applied for use in generating a plurality of conversational utterances about one or more of the identified facets that have a consensus. Further, one or more of the conversational utterances are generated by fitting one or more of the facets to one or more predefined conversational frameworks.

Further, the implementations described in any of the previous paragraphs may also be combined with one or more additional implementations and alternatives. For example, some or all of the preceding implementations may be combined with means, processes or techniques for outputting one or more relevant conversational utterances via one or more output devices.

Further, the implementations described in any of the previous paragraphs may also be combined with one or more additional implementations and alternatives. For example, some or all of the preceding implementations may be combined with means, processes or techniques for determining relevancy of conversational utterances as a reactive response to a user input.

Further, the implementations described in any of the previous paragraphs may also be combined with one or more additional implementations and alternatives. For example, some or all of the preceding implementations may be combined with means, processes or techniques for determining relevancy of conversational utterances as a proactive response to current circumstances associated with a user.

Further, the implementations described in any of the previous paragraphs may also be combined with one or more additional implementations and alternatives. For example, some or all of the preceding implementations may be combined with means, processes or techniques for determining relevancy of conversational utterances as a response to a user profile associated with a user.

Further, the implementations described in any of the previous paragraphs may also be combined with one or more additional implementations and alternatives. For example, some or all of the preceding implementations may be combined with means, processes or techniques for using a video of a digital avatar having a plurality of features to output one or more of the relevant conversational utterances.

Further, the implementations described in any of the previous paragraphs may also be combined with one or more additional implementations and alternatives. For example, some or all of the preceding implementations may be combined with means, processes or techniques for modifying of one or more features of the digital avatar via a user interface.

Further, the implementations described in any of the previous paragraphs may also be combined with one or more additional implementations and alternatives. For example, some or all of the preceding implementations may be combined with means, processes or techniques for applying a machine-learned translation model to fit one or more of the conversational utterances to one or more predefined personality types.

Further, the implementations described in any of the previous paragraphs may also be combined with one or more additional implementations and alternatives. For example, some or all of the preceding implementations may be combined with means, processes or techniques for associating one or more of the predefined personality with a predefined linguistic style.

Further, the implementations described in any of the previous paragraphs may also be combined with one or more additional implementations and alternatives. For example, some or all of the preceding implementations may be combined with means, processes or techniques for modifying one or more features of one or more of the predefined personality types via a user interface.

Further, the implementations described in any of the previous paragraphs may also be combined with one or more additional implementations and alternatives. For example, some or all of the preceding implementations may be combined with means, processes or techniques for representing the consensus as a consensus facet where two or more samples of the sentiment-bearing content refer to the same facet for a particular conversational topic.

Further, the implementations described in any of the previous paragraphs may also be combined with one or more additional implementations and alternatives. For example, some or all of the preceding implementations may be combined with means, processes or techniques for representing the consensus as a consensus sentiment where two or more samples of the sentiment-bearing content are determined as referring to a common sentiment for a particular facet.

In additional implementations, a system is provided via means, processes or techniques for applying a machine-learned facet model to sentiment-bearing content to identify and label facets for each conversational topic associated with those facets, and to identify corresponding sentiments. Multiple conversational utterances are then populated by fitting one or more labelled facets into one or more conversational frameworks that are consistent with the identified corresponding sentiments. One or more conversational utterances relevant to a user are then selected. One or more of the selected conversational utterances are then presented to the user via one or more output devices.

Further, the implementations described in any of the previous paragraphs may also be combined with one or more additional implementations and alternatives. For example, some or all of the preceding implementations may be combined with means, processes or techniques for applying a machine-learned translation model to fit one or more of the conversational utterances to one or more predefined linguistic styles.

Further, the implementations described in any of the previous paragraphs may also be combined with one or more additional implementations and alternatives. For example, some or all of the preceding implementations may be combined with means, processes or techniques for determining the relevancy of one or more of the conversational utterances presented to the user in response to a user input.

Further, the implementations described in any of the previous paragraphs may also be combined with one or more additional implementations and alternatives. For example, some or all of the preceding implementations may be combined with means, processes or techniques for determining the relevancy of one or more of the conversational utterances presented to the user in response to current environmental circumstances associated with the user.

Further, the implementations described in any of the previous paragraphs may also be combined with one or more additional implementations and alternatives. For example, some or all of the preceding implementations may be combined with means, processes or techniques for presenting one or more of the selected conversational utterances via a combined audio and video display of a digital avatar having a user-selected personality type.

In additional implementations, a portable computing device is provided via means, processes or techniques for applying a machine-learned facet model to identify conversational topics and facets associated with one or more segments of a plurality of samples of sentiment-bearing content. A consensus is then determined for one or more identified facets, the consensus for each facet being based on two or more samples of the sentiment-bearing content. This information is then used to generate a plurality of conversational utterances about one or more of the identified facets, each of the conversational utterances being consistent with the corresponding consensus. Further, one or more of the conversational utterances are generated by fitting one or more of the facets to one or more predefined conversational frameworks that are consistent with the associated consensus. One or more of the conversational utterances that are relevant to a user are then identified. One or more of the relevant conversational utterances are then output via one or more output devices.

Further, the implementations described in any of the previous paragraphs may also be combined with one or more additional implementations and alternatives. For example, some or all of the preceding implementations may be combined with means, processes or techniques for fitting one or more of the conversational utterances to one or more predefined linguistic styles.

Further, the implementations described in any of the previous paragraphs may also be combined with one or more additional implementations and alternatives. For example, some or all of the preceding implementations may be combined with means, processes or techniques for identifying one or more of the conversational utterances that are relevant to a user by evaluating a user input in combination with a user profile, and in further combination with one or more grounding factors representing current environmental circumstances associated with the user.

5.0 Exemplary Operating Environments

Figure 5:
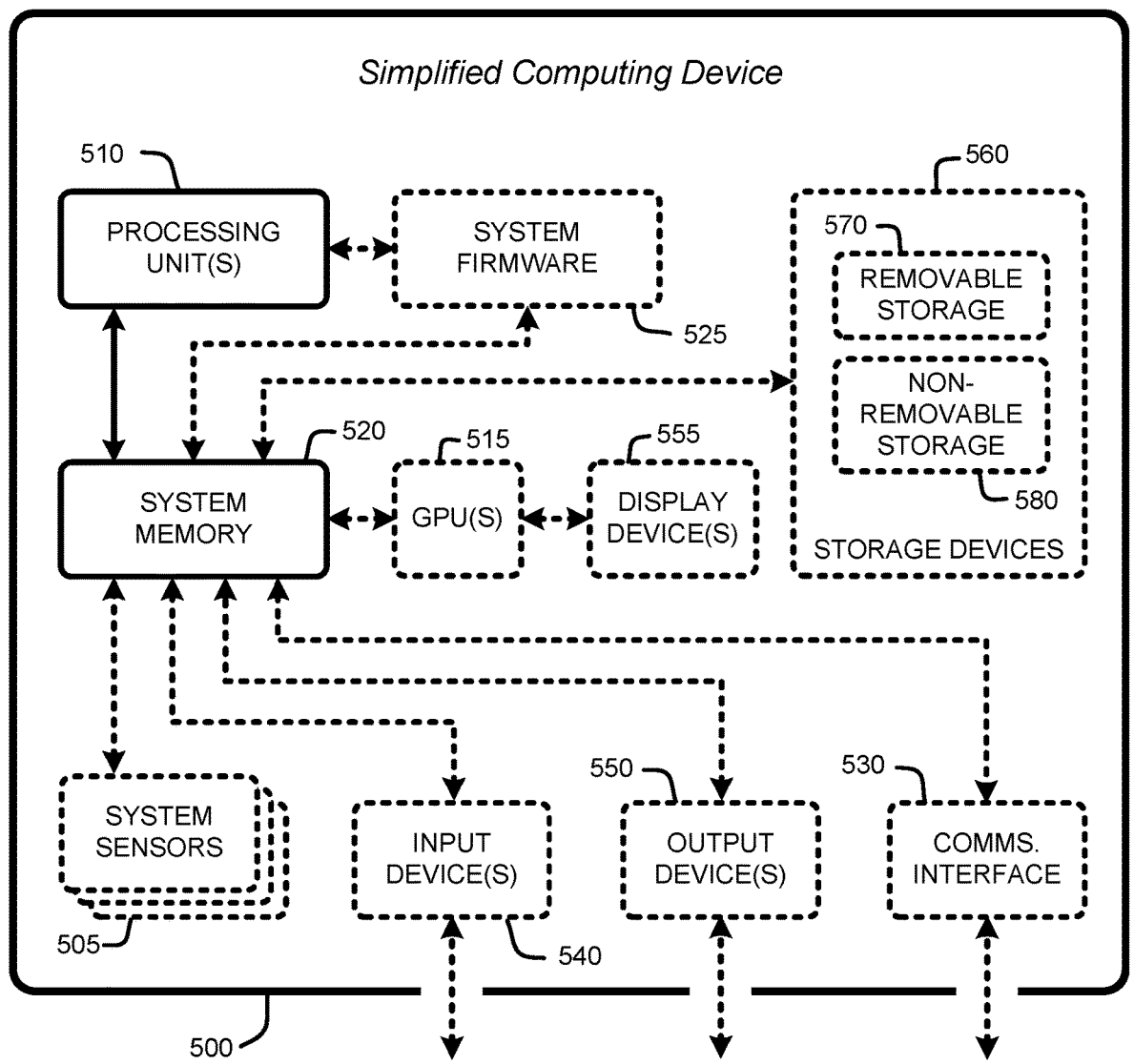
FIG. 5 is a general system diagram depicting a simplified general-purpose computing device having simplified computing and I/O capabilities for use in effecting various implementations of the Facet Recommender, as described herein.

The Facet Recommender implementations described herein are operational within numerous types of general purpose or special purpose computing system environments or configurations. FIG. 5 illustrates a simplified example of a general-purpose computer system on which various implementations and elements of the Facet Recommender, as described herein, may be implemented. It is noted that any boxes that are represented by broken or dashed lines in the simplified computing device 500 shown in FIG. 5 represent alternate implementations of the simplified computing device. As described below, any or all of these alternate implementations may be used in combination with other alternate implementations that are described throughout this document.

The simplified computing device 500 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the Facet Recommender implementations described herein, the device should have a sufficient computational capability and system memory to enable basic computational operations. In particular, the computational capability of the simplified computing device 500 shown in FIG. 5 is generally illustrated by one or more processing unit(s) 510, and may also include one or more graphics processing units (GPUs) 515, either or both in communication with system memory 520. Note that that the processing unit(s) 510 of the simplified computing device 500 may be specialized microprocessors (such as a digital signal processor (DSP), a very long instruction word (VLIW) processor, a field-program mable gate array (FPGA), or other micro-controller) or can be conventional central processing units (CPUs) having one or more processing cores and that may also include one or more GPU-based cores or other specific-purpose cores in a multi-core processor.

In addition, the simplified computing device 500 may also include other components, such as, for example, a communications interface 530. The simplified computing device 500 may also include one or more conventional computer input devices 540 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 500 and with any other component or feature of the Facet Recommender, including input, output, control, feedback, and response to one or more users or other devices or systems associated with the Facet Recommender, are enabled by a variety of Natural User Interface (NUI) scenarios. The NUI techniques and scenarios enabled by the Facet Recommender include, but are not limited to, interface technologies that allow one or more users user to interact with the Facet Recommender in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other input devices 540 or system sensors 505. Such NUI implementations are also enabled by the use of various techniques including, but not limited to, information derived from system sensors 505 or other input devices 540 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices.

Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the Facet Recommender.

However, it should be understood that the aforementioned exemplary NUI scenarios may be further augmented by combining the use of artificial constraints or additional signals with any combination of NUI inputs. Such artificial constraints or additional signals may be imposed or generated by input devices 540 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the Facet Recommender.

The simplified computing device 500 may also include other optional components such as one or more conventional computer output devices 550 (e.g., display device(s) 555, audio output devices, video output devices, devices for transmitting wired or wireless data transmissions, and the like). Note that typical communications interfaces 530, input devices 540, output devices 550, and storage devices 560 for general-purpose computers are well known to those skilled in the art, and will not be described in detail herein.

The simplified computing device 500 shown in FIG. 5 may also include a variety of computer-readable media. Computer-readable media can be any available media that can be accessed by the computing device 500 via storage devices 560, and include both volatile and nonvolatile media that is either removable 570 and/or non-removable 580, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), Blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various Facet Recommender implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware 525, hardware, or any combination thereof to control a computer to implement the disclosed subject matter. The term "article of manufacture" as used herein is intended to encompass a computer program accessible from any computer-readable device, or media.

The Facet Recommender implementations described herein may be further described in the general context of computer-executable instructions, such as program modules, being executed by a computing device. Generally, program modules include routines, programs, objects, components, data structures, and the like, that perform particular tasks or implement particular abstract data types. The Facet Recommender implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

6.0 Other Implementations

The foregoing description of the Facet Recommender has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate implementations may be used in any combination desired to form additional hybrid implementations of the Facet Recommender. It is intended that the scope of the Facet Recommender be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the Facet Recommender described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

What is claimed is:

1. A computer-implemented process, comprising:
receiving a machine-learned facet model;
the machine-learned facet model automatically generated by applying one or more automated machine-learning processes to a plurality of examples of training data to train the machine-learned facet model;
the plurality of examples of training data comprising a plurality of automatically clustered and labeled instances of sentiment vocabulary extracted from sentiment bearing content;
applying the machine-learned facet model to evaluate a plurality of samples of sentiment-bearing content to identify conversational topics and facets associated those conversational topics;
identifying one or more of the facets that have a consensus based on two or more samples of the sentiment-bearing content;
generating, from a combination of one or more of the identified facets and one or more current grounding factors associated with a user, a plurality of sentiment-based recommendations about one or more of the identified facets; and
presenting one or more of the sentiment-based recommendations to the user.

2. The computer-implemented process of claim 1 wherein presenting one or more of the sentiment-based recommendations further comprises changing a visual appearance of existing content to indicate a type of sentiment associated with one or more corresponding facets identified in the existing content.

3. The computer-implemented process of claim 1 further comprising determining a relevancy of one or more of the sentiment-based recommendations to the user.

4. The computer-implemented process of claim 3 wherein relevancy of conversational utterances is determined as a response to a user query input.

5. The computer-implemented process of claim 3 wherein relevancy of conversational utterances is determined as a response to the current grounding factors associated with the user.

6. The computer-implemented process of claim 3 wherein relevancy of conversational utterances is determined as a response to a user profile associated with a user.

7. The computer-implemented process of claim 1 further comprising:
generating a plurality of conversational utterances about one or more of the sentiment-based recommendations; and
outputting one or more of the conversational utterances via one or more output devices.

8. The computer-implemented process of claim 7, further comprising rendering a digital avatar to output one or more of the conversational utterances.

9. The computer-implemented process of claim 8 further comprising a user interface for modifying of one or more features of the digital avatar.

10. The computer-implemented process of claim 1 wherein the grounding factors further comprise any combination of one or more of weather, time of day, local traffic, local noise levels, geographic location, geographic views, video content, user history, user profile, and current user circumstances.

11. A system, comprising:
a general purpose computing device; and
a computer program executable by the computing device, wherein the computing device is directed by the computer program to:
receive a machine-learned facet model trained on a plurality of examples of training data;
the plurality of examples of training data comprising a plurality of automatically clustered and labeled instances of sentiment vocabulary extracted from sentiment bearing content;
apply the machine-learned facet model to sentiment-bearing content to identify and label facets for each conversational topic associated with those facets, and to identify corresponding sentiments;
generate a plurality of sentiment-based recommendations about one or more of the identified facets that have a consensus; and
generate multiple sentiment-based recommendations that are consistent with the identified corresponding sentiments and that are further consistent with one or more grounding factors associated with a user; and
present one or more of the sentiment-based recommendations to the used.

12. The system of claim 11 wherein presenting one or more of the sentiment-based recommendations further comprises automatically changing a visual appearance of existing content to indicate a type of sentiment associated with one or more corresponding facets identified in the existing content.

13. The system of claim 11 wherein presenting one or more of the sentiment-based recommendations further comprises:
determining a relevancy to the user of one or more of the sentiment-based recommendations; and
presenting the one or more sentiment-based recommendations based on the determination of relevancy to the user.

14. The system of claim 11 wherein the grounding factors further comprise any combination of one or more of weather, time of day, local traffic, local noise levels, geographic location, geographic views, video content, user history, user profile, and current user circumstances.

15. The system of claim 11 further comprising:
populating multiple conversational utterances by fitting one or more labelled facets into one or more conversational frameworks that are consistent with the identified corresponding sentiments; and
presenting one or more of the conversational utterances to the user via one or more output devices.

16. The system of claim 15 wherein one or more of the selected conversational utterances is presented via a combined audio and video display of a digital avatar having a user-selected personality type.

17. A portable computing device comprising:
a memory configured to store a computer program; and
a processing unit configured to execute the computer program, thereby causing the computing device to:
receive a machine-learned facet model automatically generated by applying one or more automated machine-learning processes to a plurality of examples of training data comprising a plurality of automatically clustered and labeled instances of sentiment vocabulary extracted from sentiment bearing content;
apply the machine-learned facet model to identify conversational topics and facets associated with one or more segments of a plurality of samples of sentiment-bearing content;
determine a consensus for one or more identified facets, the consensus for each facet being based on two or more samples of the sentiment-bearing content;
generate a plurality of recommendations about one or more of the identified facets, each of the recommendations being consistent with the corresponding consensus and further being consistent with one or more grounding factors associated with a user;
identify one or more of the recommendations that are relevant to a user; and
present one or more of the relevant recommendations to the user in the form of a conversational utterance provided via a combined audio and video display of a digital avatar.

18. The portable computing device of claim 17 further comprising presenting one or more of the relevant recommendations by automatically changing a visual appearance of existing content to indicate a type of sentiment associated with one or more corresponding facets identified in the existing content.

19. The portable computing device of claim 17 further comprising:
generating a plurality of conversational utterances about one or more of the identified facets, each of the conversational utterances being consistent with the corresponding consensus; and
wherein one or more of the conversational utterances are fit to one or more predefined linguistic styles.

20. The portable computing device of claim 17 wherein the grounding factors further comprise any combination of one or more of weather, time of day, local traffic, local noise levels, geographic location, geographic views, video content, user history, user profile, and current user circumstances.

* * * * *